Figure 1:
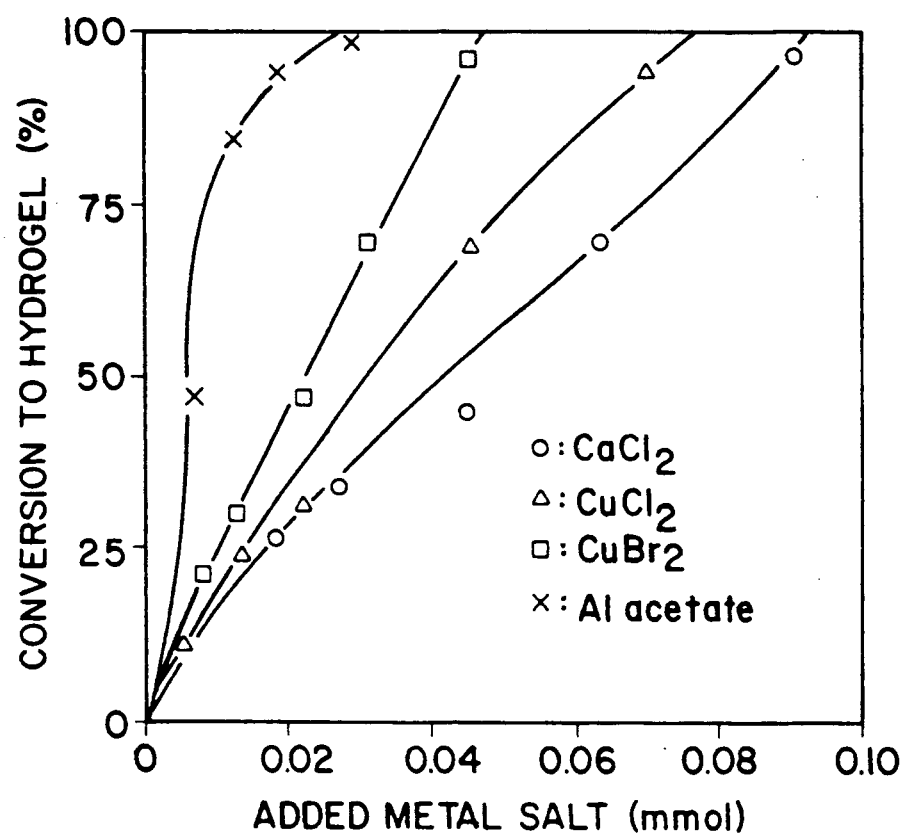

United States Patent [19]

Allcock et al.

[11] Patent Number: 5,053,451

[45] Date of Patent: Oct. 1, 1991

[54] IONICALLY CROSS-LINKABLE POLYPHOSPHAZENE: POLY(BIS(CARBOXYLATOPHENOXY) PHOSPHAZENE) AND ITS HYDROGELS AND MEMBRANES

[75] Inventors: Harry R. Allcock, State College, Pa.; Sukky Kwon, Elkhart, Ind.

[73] Assignee: The Pennsylvania Research Corporation, University Park, Pa.

[21] Appl. No.: 467,821

[22] Filed: Jan. 19, 1990

[51] Int. Cl.$^5$ ............................................. C08G 79/04
[52] U.S. Cl. .................................. 524/600; 524/606; 524/608; 558/157; 528/271; 528/168; 528/169
[58] Field of Search ............. 558/157; 528/168, 169; 524/600

[56] References Cited

U.S. PATENT DOCUMENTS 4,387,208  6/1983  Allcock et al. ...................... 528/168

FOREIGN PATENT DOCUMENTS 17223  8/1988  Japan .

OTHER PUBLICATIONS

Allcock, H. R., Chem. Eng. News 63:22 (1985).
Allcock, H. R. et al., Macromolecules, vol. 13, No. 6, pp. 1325-1329 (1988).

Primary Examiner—Mukund J. Shah
Assistant Examiner—Jyothsna Venkat
Attorney, Agent, or Firm—Thomas J. Monahan

[57] ABSTRACT

Hexachlorocyclotriphosphazene and poly(dichlorophosphazene) react with the sodium salt of ethyl p-hydroxybenzoate to give small molecule cyclic and high polymeric phosphazenes with aryloxy ester side groups; reaction of these compounds with potassium tert-butoxide brings about complete hydrolysis of the ester groups to yielding aqueous media-soluble, carboxylic acid bearing cyclic and high polymeric phosphazenes; the carboxylic acid bearing high polymer formed ionic cross-links when treated in aqueous media with salts of di- or trivalent cations yield hydrogels and membranes. The cross-linked gels were stable in neutral or strongly acidic aqueous media, but the cross-linking process was reversed in basic aqueous solutions of excess monovalent cations.

4 Claims, 1 Drawing Sheet

IONICALLY CROSS-LINKABLE POLYPHOSPHAZENE: POLY(BIS(CARBOXYLATOPHENOXY) PHOSPHAZENE) AND ITS HYDROGELS AND MEMBRANES

Research leading to the development of the present invention was supported in part by funds from the National Institutes of Health. Accordingly, the United States government has certain statutory rights to the present invention under 35 USC 200 et. seq.

The design and synthesis of new macromolecules for the preparation of membranes is one of the major challenges of modern polymer chemistry. At present a variety of polymeric membranes are used in applications as diverse as gas separations, microfiltration, hyperfiltration, hemodialysis, electrodialysis, controlled drug delivery, and genetic engineering. However, the continued need for new membrane materials in biomedical engineering is particularly acute.

The synthetic polymers currently used as membranes can be divided into two categories: (1) neutral polymers such as polyethylene, poly(methyl meth-acrylate), poly(organosiloxanes), and cellulose, and (2) ionic polymers such as poly(acrylic acid) sulfonated polystyrene, and perfluorinated ionomers. The consideration of a polymer for incorporation into membranes involves a subtle balancing of properties such as hydrophilicity, molecular weight, crystallinity, polarity, mechanical strength, and the solvation-type affinity between specific polymers and small molecule solutes or gas molecules. In these terms, the tailoring of sophisticated membrane systems is still in its infancy.

In prior publications, we have reported that the macromolucular substitutive synthesis of poly(organophosphazenes) (Compound 1) allows the properties of these polymers to be varied over a wide range by the incorporation of different substituent groups (R) [Allcock, H. R. Chem. Eng. News 63:22 (1985)].

These property changes can be orchestrated with great subtlety both by varying the R group in single-substituent polymers and by the use of two or more cosubstituent groups attached to the same chain. In this way individual polymers may be hydrophobic, amphiphilic, or hydrophilic; water-stable or water-erodable; crystalline or amorphous; or bioinert or bioactive. Previous work (Allcock, H. R.; Kwon, S. Macromolecules 1988, 21 1980) has developed methods for the radiation cross-linking of specific polyphosphazenes in order to optiminze their behavior as membranes or hydrogels.

The present invention discloses an alternative method for the formation of cross-links, particularly cross-links that can be broken readily by a change of pH in aqueous media. The discovery of the present invention involved the development of a new and novel method for the synthesis of new phosphazenes with carboxylic acid units in the para positions of aryloxy groups attached to a phosphazene chain (Compound 2). This polymer is soluble in basic aqueous media. Like poly(acrylic acid) [Harbert, A. C.; Burns, C. M.; Huang, R. Y. M. J. Appl. Polym. Sci. 24:801 (1979)]; polymer 2 cross-links in the presence of di- or trivalent cations, and this process has been used to form hydrogels and membranes that can be resolubilized by exchange of cations.

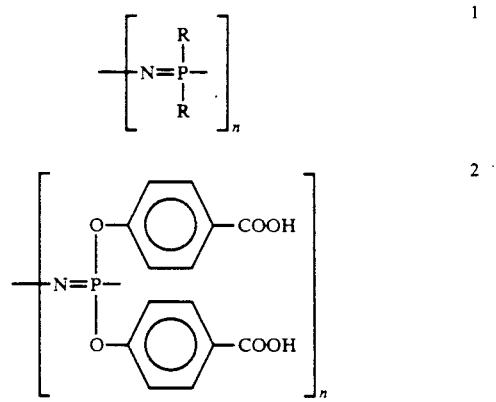

Various aspects of the present invention can be better understood by reference to the following figure, description and examples.

FIG. 1 indicates the fraction of ionically cross-linked polymer (hydrogel) formed by the interaction between $[NP(OC_6H_4COOH)_2]_n$ (Compound 5b) and various metal salts in water. The percentage conversion to cross-linked polymer was estimated from the weight of recovered, un-cross-linked polymer.

The synthesis route chosen for the introduction of carboxylic acid containing side groups, according to the present invention, involves the reaction of the sodium salt of ethyl p-hydroxybenzoate with poly(dichlorophosphazene), $(NPCl_2)_n$, followed by hydrolysis of the ester function to the carboxylic acid. Previous experience indicated that the reaction conditions chosen for both steps would be critical and that the exploration of such conditions could be best carried out first at the small molecule level rather than with the high polymer [Allcock, H. R. Acc. Chem. Res. 12:351 (1979)]. Hence, preliminary studies were performed with the use of the phosphazene cyclic trimer, $(NPCl_2)_3$, as a model for the high polymer.

The overall reaction is shown in Scheme I:

Scheme I

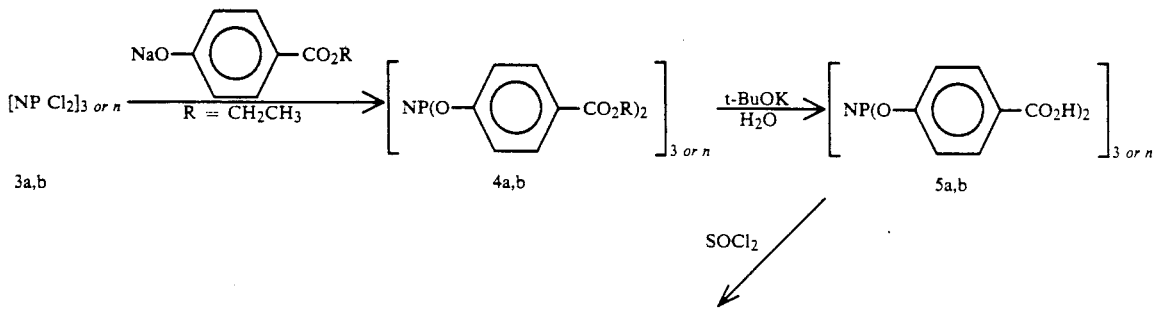

-continued
Scheme I

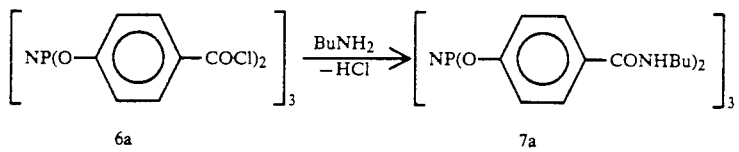

6a                                      7a a = cyclic trimer
b = high polymer (n = 8,000)

Thus, at the cyclic trimer level, hexachlorocyclotriphosphazene (3a) was allowed to react with the sodium salt of ethyl p-hydroxybenzoate to form the ester-type aryloxyphosphazene, 4a. The structure of this compound was confirmed by elemental analysis (see Table I) and by NMR and infrared spectroscopy. For example, the $^{31}$P NMR spectrum showed a singlet at +7.7 ppm, and the $^1$H NMR spectrum consisted of two doublets at +7.1 to +8.0 ppm (aromatic protons), a quartet at +4.3 ppm (methylene protons), and a triplet at +1.4 ppm (methyl protons). The infrared spectrum contained a C=O stretch at 1710 cm$^{-1}$ and a P=N/P—O combination band at 1250 cm$^{-1}$.

Hydrolysis of 4a to the carboxylic acid was attempted by several methods, including acidic hydrolysis with hydrochloric acid in tetrahydrofuran or with p-toluenesulfonic acid or basic hydrolysis with sodium hydroxide. These attempts failed to give the hexacarboxylic acid derivative without decomposition of the skeleton. However, the use of potassium tert-butoxide [Gassman, P. G.; Schenk, W. N. *J. Org. Chem.* 42:918 (1977)] brought about a clean hydrolysis of 4a to 5a. The structure of 5a was verified by elemental analysis, NMR, and infrared techniques (see Table I) and by derivatization of the carboxylic acid units.

be favorable evidence that the same reactions might be feasible at the high polymeric level.

With regard to high polymer reactions, poly(dichloro-phosphazene) (3b) was allowed to react with the sodium salt of ethyl p-hydroxybenzoate to form the (aryloxy)phosphazene ester, 4b. Polymer 4b is a microcrystalline, flexible, film-forming material with a glass transition temperature of +7.5° C. and a $T_m$ of 127.4° C. The molecular weight of 4b was estimated by gel permeation chromatography to be in the region of $3 \times 10^6$. In solid-state properties and in appearance, polymer 4b is similar to poly(diphenoxyphosphazene), [NP(OC$_6$H$_5$)$_n$ (Allcock, H. R.; Kugel, R. L. *J. Am. Chem. Soc.* 87:4216 (1965); and Allcock, H. R.; Kugel, R. L.; Valan, K. *J. Inorg. Chem* 5:1709 (1966)].

Hydrolysis of 4b of the carboxylic acid derivative, 5b, was accomplished with potassium tert-butoxide with the use of reaction conditions similar to those established for the cyclic trimer. Polymer 5b was isolated as a white powder that was insoluble in acidic or neutral aqueous media but soluble in aqueous base. The structures of polymers 4b and 5b were deduced from a combination of microanalysis, an infrared date (c.f., Table I). For example, after the hydrolysis the $^{31}$P NMR spectrum of 5b consisted of a clean singlet at −19.4 ppm.

TABLE I

| | | Characterization Data for Trimers and High Polymers | | | | | |
|---|---|---|---|---|---|---|---|
| | analysis[a] | | | | | | |
| compd | | % C | % H | % N | % Cl | $^{31}$P NMR,[b] ppm | $^1$H NMR, ppm | IR, cm$^{-1}$ |
| 4a | calcd | 57.4 | 4.79 | 3.73 | | singlet at +7.7 | two doublets at 7.1–8.0 | 1710 (C=O) |
| | found | 57.36 | 4.84 | 3.78 | 0.02 | | quartet at 4.3 | 1250 (P=N/P—O) |
| | | | | | | | triplet at 1.4 | |
| 5a | calcd | 52.66 | 3.13 | 4.39 | | singlet at +9.0 | two doublets at 6.9–7.7 | 2500–3500 (OH) |
| | found | 52.80 | 3.21 | 4.31 | | | | 1670 (C=O) |
| | | | | | | | | 1240 (P=N/P—O) |
| 4b | calcd | 57.53 | 4.79 | 3.73 | | singlet at −20.3 | two doublets at 6.9–7.7 | 1710 (C=O) |
| | found | 57.25 | 4.94 | 3.66 | 0.03 | | quartet at 4.2 | 1260 (P=N/C—O) |
| | | | | | | | triplet at 1.3 | |
| 5b | calcd | 52.60 | 3.13 | 4.38 | | singlet at −19.4 | two doublets at 7.0–7.8 | 2500–3500 (OH) |
| | found | 52.68 | 3.17 | 4.35 | | | | 1680 (C=O) |
| | | | | | | | | 1250 (P=N/P—O) |

Thus, compound 5a was treated with thionyl chloride to form the acid chloride (6a), and this reacted with n-butylamine in the presence of triethylamine to give the n-butylamido derivative, 7a. The structure proof for this compound was based on the following data. First, the conversion of 4a to 5a and 6a was accompanied by a disappearance of the infrared OH stretching bands but a retention of the skeletal P=N/P—O band at 1250 cm$^{-1}$. The $^{31}$P NMR spectrum of 7a in methylene chloride consisted of a singlet at +8.45 ppm. The $^1$H NMR spectrum included two doublets at +7.0 to +8.45 ppm (aromatic protons), a quartet at +3.3 ppm (NH—CH$_2$), a multiplet at +1.3 to +1.8 ppm (NHCH$_2$CH$_2$CH$_2$CH$_3$), and a triplet at +0.9 ppm (CH$_3$). The survival of the phosphazene ring throughout these side-group transformations was considered to The $^1$H NMR spectrum of 5b showed that the quartet at 4.3 ppm and the triplet at 1.4 ppm (C$_2$H$_5$ groups) had disappeared, but the aromatic protons at 6.8–7.7 ppm remained. Conversion of the ester (4b) to the carboxylic acid (5b) brought about a slight lowering in the $T_g$ to −4.7° C.

Unlike the water-soluble polymers studied previously in which methylamino, methoxyethoxyethoxy, or protected glyceryl side groups were attached to a phosphazene ring, polymer 5b did not cross-link when exposed to gamma radiation. This difference is ascribed to the availability of aliphatic carbon-hydrogen bonds in the first three polymers and their absence in 5b. Attempts to cross-link 5b by chemical condensation of the carboxylic acid groups with di- or trifunctional reagents, such as diamines or glycerol, were impeded by experimental difficulties. The difficulty encountered in the isolation of covalently cross-linked systems after treatment with diamines is due to the limited choice of suitable solvents and the fact that, in solvents such as dimethyl sulfoxide, salt formation precedes covalent coupling. Condensation cross-linking with diols or triols in the presence of dicyclohexylcarbodiimide is difficult to accomplish because of the persistent presence of traces of water in the reactants.

However, it was found that polymer 5b underwent facile cross-linking in aqueous media when treated with salts of di- or trivalent cations, such as calcium (as calcium chloride), copper (as copper bromide or copper sulfate), or aluminum (as aluminum acetate). The amount of water-swelled, cross-linked polymer formed increased as the concentration of calcium chloride, copper chloride, copper sulfate, or aluminum acetate was increased. FIG. 1 illustrates the relative effectiveness of the different salts in bringing about total gelation of the system. The markedly greater effectiveness of aluminum ion can be attributed to its trivalent character. In these experiments, $Cu^{2+}$ appeared to be a more effective cross-linking agent than $Ca^{2+}$, perhaps because cupric ion has a higher preference for octahedral coordination than does the $Ca^{2+}$ ion or because of the greater Lewis acidity of $Cu^{2+}$ that results from its smaller radius. Thus, the cross-linking process can be understood in terms of "salt bridges" between the chains, as shown in Scheme II.

Scheme II

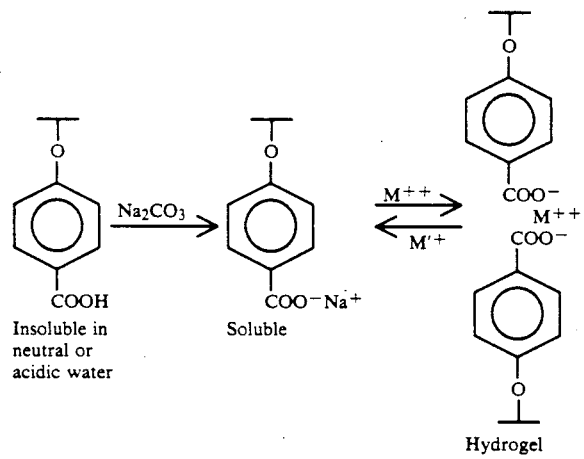

The hydrogels and membranes formed by this process were soft, highly swollen materials. An aluminum ion cross-linked example was found to contain 9.5 g of water for every 1 g of polymer.

The cross-linking process could also be effected by immersion of solid films of polymer 5b into aqueous solutions of, for example, copper sulfate. Instead of dissolving, the polymer film swelled as water penetrated the matrix, but the swelling was limited by the diffusion of cupric ions into the polymer.

Ionically cross-linked gels formed by both processes were stable in acidic and neutral media. However, treatment with basic solutions of monobalent cations resulted in cleavage of the ionic cross-links and dissolution of the polymer. This occurred at pH 7.5 for systems cross-linked by $Ca^{2+}$ or $Cu^{2+}$ ions, but the $Al^{3+}$ cross-linked systems required base strengths in excess of pH 9 before the polymer dissolved. Treatment of the $Ca^{2+}$, $Cu^{2+}$, and $Al^{3+}$ cross-linked polymers with excess aqueous potassium chloride at pH 7.5 also resulted in cleavage of the ionic cross-links.

In the following examples, the materials tetrahydrofuran, dioxane, and diethyl ether were freshly distilled under nitrogen from sodium benzophenone ketyl; Hexachlorocyclotriphosphazene (mp 110°–113° C.) was obtained from a tetramertrimer mixture, which was purified by two fractional vacuum sublimations at 60° C./0.5 Torr, two recrystallizations from hexane, and two further vacuum sublimations; Poly(dichlorophosphazene) was prepared by the thermal ring-opening polymerization of hexachlorocyclotriphosphazene at 250° C. [Allcock, H. R.; Kugel, R. L.; Valan, K. J. *Inorg. Chem* 5:1709 (1966)]; Ethyl p-hydroxybenzoate was purified by recrystallization from methylene chloride and hexane; and Triethylamine and n-butylamine were purified by vacuum distillation in the presence of calcium hydride. The distilled amines were stored over molecular sieves before use. Potassium tert-butoxide, p-toluenesulfonic acid, hydrochloric acid, thionyl chloride, copper sulfate, glycerol, sodium spheres, sodium hydroxide, dimethyl sulfoxide, calcium chloride, copper chloride, copper bromide, and aluminum acetate were used as received from commercial sources.

EXAMPLE I

Preparation of Compound 4a

Sodium spheres (1.99 g., 0.084 mol) were added to 150 mL of dry dioxane. To the suspension was added ethyl p-hydroxybenzoate (18.7 g, 0.112 mol) dissolved in dry dioxane (30 mL), and the mixture was stirred at reflux for 10 h. To this sodium salt solution was slowly added compound 3a (2.5 g., 7.2 mmol), followed by the addition of tetra-n-butylammonium bromide (0.4 g) to assist complete substitution. The reaction mixture was then stirred at reflux for 72 h. The $^{31}P$ NMR spectrum of the solution showed a singlet at +7.7 ppm. The solution was filtered through a 1-inch layer of silica gel, and the solvent was removed by evaporation. The compound was purified by column chromatography with an eluent mixture of methylene chloride and THF (9:1). After drying under vacuum, a bright yellow solid (4a) (82%), mp 78°–80° C., was obtained.

EXAMPLE II

Preparation of Compound 5a

Potassium tert-butoxide (4.43 g, 0.043 mol) was suspended in 100 mL of dry ether. This mixture was cooled to 0° C., and 0.2 mL (0.11 mol) of water was added via syringe. After 5 min in stiring at 0° C., compound 4a (0.5 g, 0144 mmol) was added. The ice bath was removed, and the mixture was allowed to react at room temperature. Thin-layer chromatography tests showed that the starting compound had disappeared completely after 20 h. A large excess of ice water was then added, and the aqueous layer was separated. The isolated aqueous solution was acidified with hydrochloric acid. After three ether extractions, water was removed by evaporation, and the final product was dried overnight under vacuum. A white solid (5a) was obtained (yield 62%). This compound did not melt below 275° C.

EXAMPLE III

Preparation of Compound 6a

Thionyl chloride (10 mL) was added to compound 5a (22 mg, 0.21 mmol). The mixture was heated to reflux and the powder dissolved completely after 1 h. After an additional 1 h, the solution was cooled and the excess thionyl chloride was removed by vacuum drying. The product dissolved in dry THF, was filtered under nitrogen, and was dried overnight under vacuum.

EXAMPLE IV

Preparation of Compound 7a

Compound 6a (100 mg, 0.1 mmol) was dissolved by dry THF (20 mL). To the solution was added an excess of n-butylamine (5 mL, 0.068 mol), followed by triethylamine (1 mL) as a hydrochloride acceptor. The mixture was stirred at room temperature for 24 h. The residual amines were removed by evaporation under vacuum to yield 7a, mp 194°–197° C.

EXAMPLE V

Preparation of Polymer 4b

Poly(dichlorophosphazene) (3b) (4 g, 0.0345 mol) was dissolved in dry dioxane (200 mL). The solution was added slowly to the sodium salt of ethyl p-hydroxybenzoate (29.8 g, 0.1794 mol). Tetra-n-butylammonium bromide (0.5 g) was added as aphase-transfer catalyst. The reaction mixture was stirred at reflux for 48 h. A $^{31}P$ NMR spectrum contained a singlet at $-20.3$ ppm. The solution was allowed to cool, and the polymer was isolated by precipitation into water. The polymer was purified by further reprecipitations from THF into water (3 times) and into hexane (twice). The yield was 85%.

EXAMPLE VI

Preparation of Polymer 5b

Polymer 4b (0.5 g, 1.33 mmol) was dissolved in dry THF (20 mL). The solution was added slowly to a mixture of potassium tert-butoxide (4 g, 0.04 mol) and 0.2 mL (0.011 mol) of water in dry THF (100 mL). For the first 5 minutes the mixture was cooled to 0° C.; it was then stirred at room temperature for 40 h. A large excess of ice water (300 mL) was added, and the solution was concentrated by evaporation. The solution was dialyzed through a cellulose tube against dionized water. After dialysis for 72 h, the polymer was isolated by acidification of the solution with hydrochloric acid. The beige-colored polymer was obtained after centrifugation and vacuum drying (yield 85%).

EXAMPLE VII

Ionic Cross-Linking Reactions with Polymer 5b

Polymer 5b (20 mg, 0.063 mmol) was dissolved in 0.2 mL of sodium carbonate solution (6 mg). To separate polymer solutions were added various concentrations of four different metal salts ($CaCl_2$, $CuCl_2$, $CuBr_2$, and aluminum acetate) in aqueous solutions (0.006–0.09 mmol). The solutions were stirred for 1 minutes to produce the cross-linked gels. The soluble portion was collected and precipitated by acidification with hydrochloric acid. The un-cross-linked polymer was then isolated by centrifugation, washing, and drying under vacuum. The weight of the cross-linked portion was estimated from the weight of the unreacted polymer. The water swellability of the gels was calculated by weighing the fully swelled gel followed by drying under vacuum for 36 h and reweighing the dry gel.

EXAMPLE VIII

Cross-Linking of Polymer Films

Polymer 5b (100 myg, 0.31 mmol) was dissolved in dimethyl sulfoxide (5 mL). The solvent was removed slowly by evaporation in a dry casting chamber in order to form a uniform and thin film. The dried polymer was then immersed in a solution of copper sulfate (5 g) in 100 mL of water and allowed to swell to the maximum allowed by this cross-linking process. The film was removed from the copper sulfate solution and dried overnight under vacuum.

Thus, while we have illustrated and described the preferred embodiment of our invention, it is to be understood that this invention is capable of variation and modification, and we, therefore, do not wish to intend to be limited to the precise terms set forth, but desire and intend to avail ourself of such changes and alterations which may be made for adapting the invention of the present invention to various usages and conditions. Accordingly, such changes and alterations are properly intended to be within the full range of equivalents and, therefore, within the purview of the following claims. The terms and expressions which have been employed in the foregoing specification are used therein as terms of description and not of limitation, and thus there is no intention in the use of such terms and expressions of excluding equivalents of features shown and described or portions thereof, it being recognized that the scope of the invention is defined and limited only by the claims which follow.

The invention described herein and the manner and process of making and using it has been described in such full, clear, concise, and exact terms so as to enable any person skilled in the art to which it pertains, or to with which it is most nearly connected, to make and use the same.

What is claimed is:

1. A poly(organophosphazene) polymer which is insoluble in acidic and neutral aqueous media, soluble in basic aqueous media, and cross-linkable in the presence of di- and tri-valent cations to form hydrogels which are stable in acidic and neutral aqueous media and which can be resolubilized by exchange with monovalent cations, said polymer having repeating monomeric units of the structure

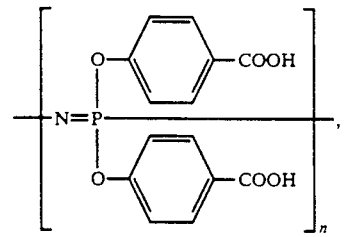

in which n is an integer from 3 to 8,000.

2. A polymer according to claim 1 in which n equals 3, said polymer being a white powder which does not melt below 275° C.

3. A polymer according to claim 1 in which n equals 8,000, said polymer being a light-colored powder.

4. A hydrogel of the polymer of claim 1 having the structure:

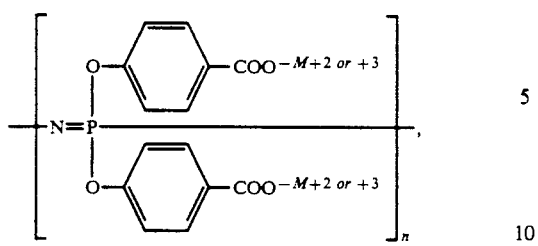
in which M is a divalent or trivalent metal cation, said hydrogel being stable in acidic and neutral aqueous media but being solubilized by the exchange of the di- or tri-valent cation M with a monovalent cation.
* * * * *